US012623529B2

(12) United States Patent
Li et al.

(10) Patent No.: US 12,623,529 B2
(45) Date of Patent: May 12, 2026

(54) VEHICLE DRIVING DEVICE AND VEHICLE

(71) Applicant: BYD COMPANY LIMITED,
Shenzhen (CN)

(72) Inventors: Jiacheng Li, Shenzhen (CN); Jun Luo,
Shenzhen (CN); Dong Zeng, Shenzhen
(CN)

(73) Assignee: BYD Company Limited, Shenzhen
(CN)

( * ) Notice: Subject to any disclaimer, the term of this
patent is extended or adjusted under 35
U.S.C. 154(b) by 0 days.

(21) Appl. No.: 19/033,319

(22) Filed: Jan. 21, 2025

(65) Prior Publication Data

US 2025/0162401 A1     May 22, 2025

Related U.S. Application Data

(63) Continuation of application No.
PCT/CN2023/090736, filed on Apr. 26, 2023.

(30) Foreign Application Priority Data

Jul. 27, 2022     (CN) .......................... 202221963231.9

(51) Int. Cl.
B60K 6/547 (2007.10)
B60K 6/387 (2007.10)
(52) U.S. Cl.
CPC .............. B60K 6/547 (2013.01); B60K 6/387
(2013.01)

(58) Field of Classification Search
CPC ...... B60K 6/547; B60K 6/40; B60K 2006/26;
B60K 6/405; B60L 15/007; F16D 13/71;
F16D 2013/70; F02C 7/36; F16H 3/54;
F16H 1/28
See application file for complete search history.

(56) References Cited

U.S. PATENT DOCUMENTS

| | | | | |
|---|---|---|---|---|
| 8,504,259 B2 * | 8/2013 | Heap | .................... | B60W 10/115 |
| | | | | 701/87 |
| 10,895,321 B2 * | 1/2021 | Peterson | ................. | F16H 61/30 |

(Continued)

FOREIGN PATENT DOCUMENTS

| | | |
|---|---|---|
| CN | 1420034 A | 5/2003 |
| CN | 102328576 A | 1/2012 |

(Continued)

OTHER PUBLICATIONS

International Search Report and Written Opinion for Application
No. PCT/CN2023/090736, mailed on Jul. 5, 2023, 11 pages.

*Primary Examiner* — Stacey A Fluhart
(74) *Attorney, Agent, or Firm* — Sheppard Mullin Richter
& Hampton LLP

(57)     ABSTRACT

A vehicle driving device includes an electric motor assembly. The electric motor assembly includes: a first electric motor, a second electric motor, and an electric motor controller. An electric motor shaft of the first electric motor and an electric motor shaft of the second electric motor extend in a length direction of a vehicle, and the first electric motor is disposed in front of the second electric motor. The electric motor controller is disposed at a top of the first electric motor and a top of the second electric motor, the first electric motor and the second electric motor are electrically connected to the electric motor controller.

17 Claims, 7 Drawing Sheets

(56) References Cited

U.S. PATENT DOCUMENTS

| | | | |
|---|---|---|---|
| 2007/0265129 A1 * | 11/2007 | Kasuya | B60K 6/405 |
| | | | 475/32 |
| 2019/0168761 A1 * | 6/2019 | Ito | B60W 20/40 |
| 2021/0309228 A1 | 10/2021 | Oguro | |
| 2022/0242222 A1 * | 8/2022 | Miura | B60K 6/547 |
| 2023/0302886 A1 * | 9/2023 | Ren | H02K 7/083 |

FOREIGN PATENT DOCUMENTS

| | | | | | |
|---|---|---|---|---|---|
| CN | 105216653 A | | 1/2016 | | |
| CN | 205059227 U | | 3/2016 | | |
| CN | 106808989 A | | 6/2017 | | |
| CN | 209159400 U | | 7/2019 | | |
| CN | 209627156 U | * | 11/2019 | | |
| CN | 112590530 A | | 4/2021 | | |
| CN | 213920648 U | | 8/2021 | | |
| CN | 114211949 A | | 3/2022 | | |
| CN | 216805098 U | | 6/2022 | | |
| CN | 115306885 A | * | 11/2022 | | B60K 6/405 |
| CN | 218228632 U | | 1/2023 | | |
| CN | 116061676 A | * | 5/2023 | | B60K 6/38 |
| JP | 2017019319 A | | 1/2017 | | |

* cited by examiner

VEHICLE DRIVING DEVICE AND VEHICLE

CROSS-REFERENCE TO RELATED APPLICATIONS

This application is a continuation application of International Patent Application No. PCT/CN2023/090736, filed on Apr. 26, 2023, which is based on and claims priority to and benefits of Chinese Patent Application No. 202221963231.9, filed on Jul. 27, 2022. The entire content of all of the above-referenced applications is incorporated herein by reference.

FIELD

The present disclosure relates to a vehicle driving device and a vehicle.

BACKGROUND

In the related art, a driving device of a hybrid vehicle includes an engine, a motor for electricity generation, and a motor for driving. The motor for electricity generation is connected to the engine, and the motor for driving is connected to a front wheel through a differential mechanism. The driving device is longitudinally mounted on a vehicle body, a gear train is arranged between the engine and the motor for electricity generation, a rotation shaft of the motor for electricity generation is configured above a crankshaft of the engine, a front wheel output shaft is configured below the motor for electricity generation, and the front wheel output shaft transfers power from the motor for driving to the differential mechanism. However, the driving device of the hybrid vehicle has a technical problem of low integration.

SUMMARY

According to an aspect of the present disclosure, a vehicle driving device is provided, which includes an electric motor assembly. The electric motor assembly includes: a first electric motor, a second electric motor, and an electric motor controller. An electric motor shaft of the first electric motor and an electric motor shaft of the second electric motor extend in a length direction of a vehicle, and the first electric motor is disposed in front of the second electric motor. The electric motor controller is disposed at a top of the first electric motor and a top of the second electric motor, the first electric motor and the second electric motor are electrically connected to the electric motor controller.

In an embodiment, the vehicle driving device further includes an oil pan connected to a bottom of the first electric motor.

In an embodiment, a housing of the second electric motor is connected to a rear surface of a housing of the first electric motor.

The electric motor controller is strip-shaped and extends in the length direction of the vehicle, and a housing of the electric motor controller is disposed at a top of the housing of the first electric motor and a top of the housing of the second electric motor.

In an embodiment, the vehicle driving device further includes an engine, a variable-speed transmission structure, and a differential. The variable-speed transmission structure is disposed on a right side of the first electric motor.

The variable-speed transmission structure includes a first electric motor transmission gear set, a second electric motor transmission gear set, an engine input gear set, an output gear set, and a clutch. The engine input gear set is connected between a first end of the clutch and the engine. The output gear set is connected between a second end of the clutch and the differential. The first electric motor transmission gear set is connected between the first electric motor and the engine input gear set. The second electric motor transmission gear set is connected between the second electric motor and the output gear set. The differential is connected to wheels of the vehicle.

In an embodiment, the engine input gear set includes an engine first-stage gear and a clutch input gear that mesh with each other. The engine first-stage gear is connected to the engine, and the clutch input gear is connected to the first end of the clutch.

The first electric motor transmission gear set includes a first electric motor first-stage gear and an engine second-stage gear that mesh with each other. The engine second-stage gear meshes with the engine first-stage gear.

In an embodiment, the output gear set includes a clutch output gear, a clutch driven gear, and a differential input shaft. The clutch output gear meshes with the clutch driven gear. The clutch driven gear is connected to the differential through the differential input shaft. The clutch output gear is connected to the second end of the clutch.

The second electric motor transmission gear set includes a second electric motor driving gear and a second electric motor driven gear that mesh with each other. The second electric motor driven gear and the clutch output gear are connected to the differential input shaft.

In an embodiment, the differential is disposed on a front lower right side of the first electric motor, and the differential input shaft is arranged on a lower right side of the first electric motor.

In an embodiment, the vehicle driving device further includes a variable-speed transmission structure housing. The variable-speed transmission structure housing is disposed to a front surface of the housing of the first electric motor. The first electric motor transmission gear set, the engine input gear set, the output gear set, and the clutch are mounted inside the variable-speed transmission structure housing. The second electric motor transmission gear set is mounted inside the housing of the first electric motor.

In an embodiment, the vehicle driving device further includes a left half shaft, a middle shaft, a right half shaft, and a middle shaft tube that is connected to a left side of the differential. The differential includes an input bevel gear, a left output bevel gear, and a right output bevel gear. The middle shaft is connected between the left output bevel gear and the left half shaft. The left half shaft is connected to a left wheel. The right half shaft is connected between the right output bevel gear and a right wheel.

The middle shaft is disposed in the middle shaft tube.

In an embodiment, the electric motor shaft of the first electric motor and the electric motor shaft of the second electric motor are spaced away in a width direction of the vehicle.

In an embodiment, the first electric motor and the second electric motor are electrically connected to the electric motor controller respectively through copper bars.

In an embodiment, a high-voltage direct-current bus interface of the electric motor controller is disposed on a right side of a housing of the electric motor controller, and the high-voltage direct-current bus interface is connected to a battery pack through a wire harness.

In an embodiment, the vehicle driving device further includes an oil-cooling plate heat exchanger, and the oil-cooling plate heat exchanger is disposed on a front left side of the first electric motor.

The vehicle driving device is applicable to a front-wheel drive vehicle or a four-wheel drive vehicle (where a wheel-side drive axle may be added to a rear axle of the four-wheel drive vehicle). The vehicle driving device is applicable to new energy vehicle models such as an off-road vehicle, a pickup, and an SUV.

According to another aspect, an embodiment of the present disclosure further provides a vehicle, including a frame and the foregoing vehicle driving device. The vehicle driving device is mounted on the frame.

In an embodiment, a lower left side of a housing of a second electric motor is connected to the frame through a first mount, and a lower right side of the housing of the second electric motor is connected to the frame through a second mount.

In an embodiment, the vehicle includes a middle channel, an accommodating cavity is disposed on a front side of the middle channel, and a rear side of the vehicle driving device extends into the accommodating cavity.

DETAILED DESCRIPTION

Figure 1:
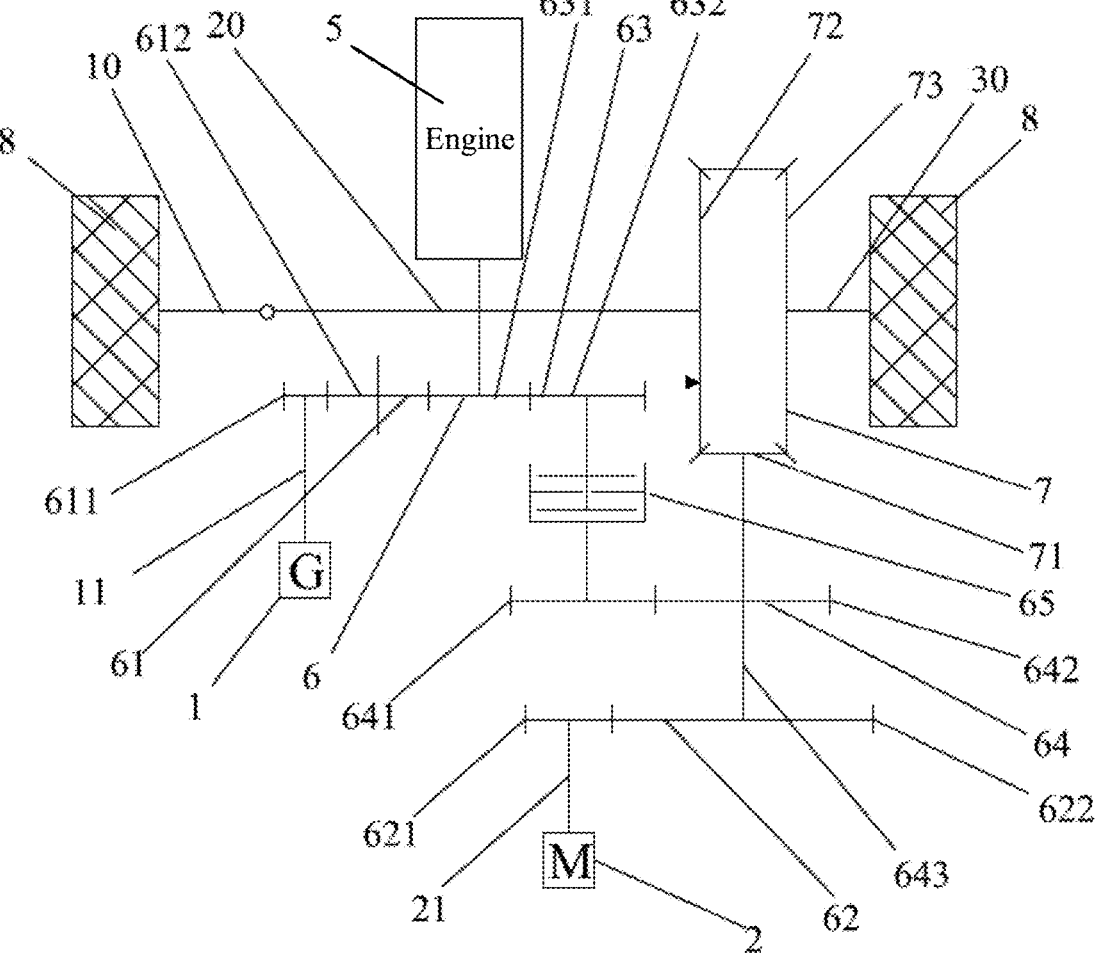
FIG. 1 is a framework diagram of a vehicle driving device according to an embodiment of the present disclosure.

To make technical problems to be resolved in the present disclosure, technical solutions, and beneficial effects clearer, the following further describes the present disclosure in detail with reference to the accompanying drawings and embodiments. It should be understood that the embodiments described herein are merely used for explaining the present disclosure, but are not used for limiting the present disclosure.

Referring to FIG. 1 to FIG. 5, a vehicle driving device provided in this embodiment of the present disclosure includes an electric motor assembly. The electric motor assembly includes a first electric motor 1, a second electric motor 2, and an electric motor controller 3. An electric motor shaft 11 of the first electric motor 1 and an electric motor shaft 21 of the second electric motor 2 extend in a length direction of a vehicle. The first electric motor 1 is arranged/disposed in front of the second electric motor 2. The electric motor controller 3 is fixed at tops of the first electric motor 1 and the second electric motor 2. The first electric motor 1 and the second electric motor 2 are electrically connected to the electric motor controller 3. That is, the electric motor controller 3 controls both the first electric motor 1 and the second electric motor 2, and there is no need to arrange/configure two electric motor controllers, to reduce costs.

In an embodiment, the first electric motor 1 is an electric generator, and the second electric motor 2 is a driving electric motor. In other words, the power of the second electric motor 2 is greater than the power of the first electric motor 1.

Figure 3:
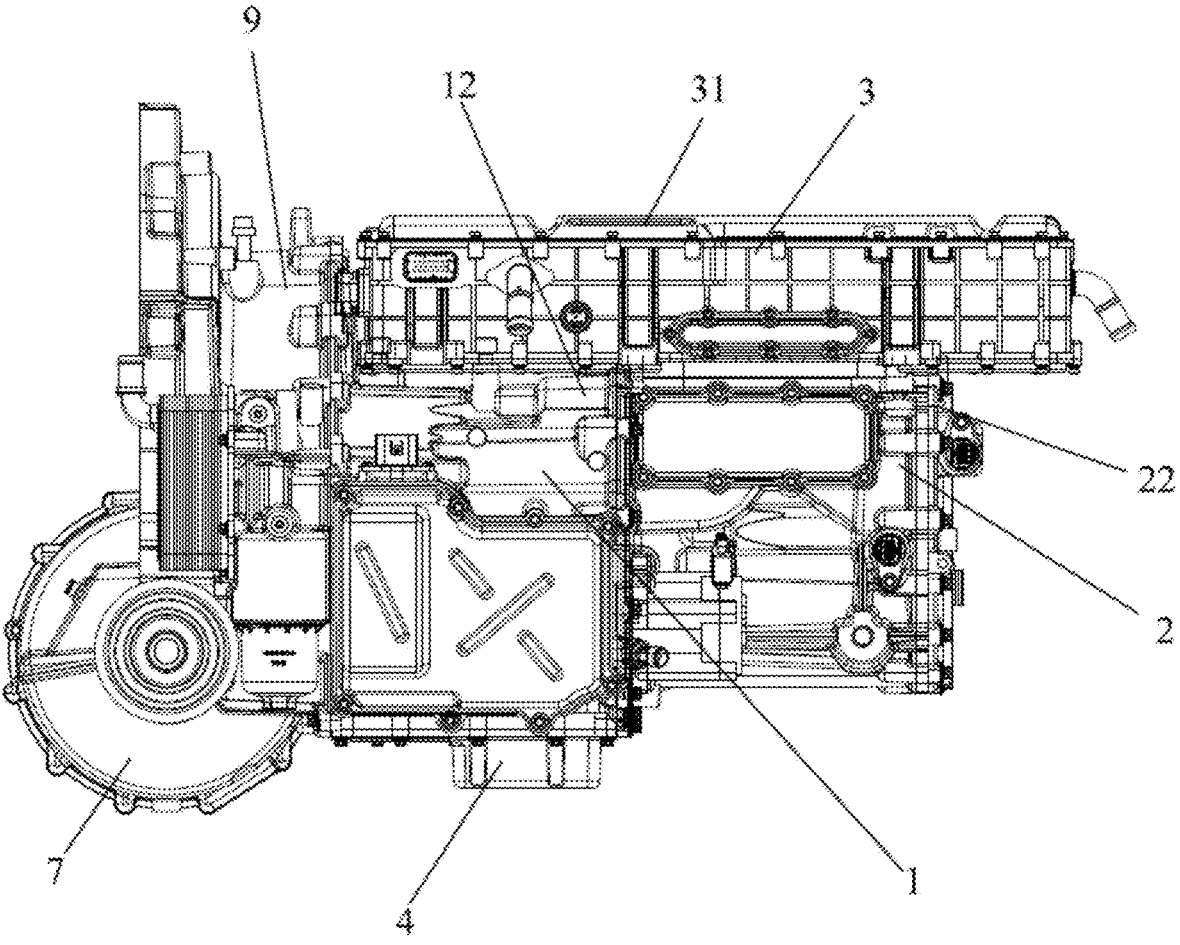
FIG. 3 is a left view of a vehicle driving device according to an embodiment of the present disclosure.

In an embodiment, referring to FIG. 3, the vehicle driving device further includes an oil pan 4 connected to a bottom of the first electric motor 1. The oil pan 4 is arranged/disposed below the first electric motor 1, so that the oil pan 4 can provide lubrication for structures such as the first electric motor 1, the second electric motor 2, and a variable-speed transmission structure 6 below, to ensure good lubrication performance on an urban road or a non-paved road.

In an embodiment, referring to FIG. 3, a housing 22 of the second electric motor 2 is connected to a rear end surface of a housing 12 of the first electric motor 1. The electric motor controller 3 is strip-shaped and extends in the length direction of the vehicle. A housing 31 of the electric motor controller 3 is fixed at a top of the housing 12 of the first electric motor 1 and a top of the housing 22 of the second electric motor 2.

Figure 4:
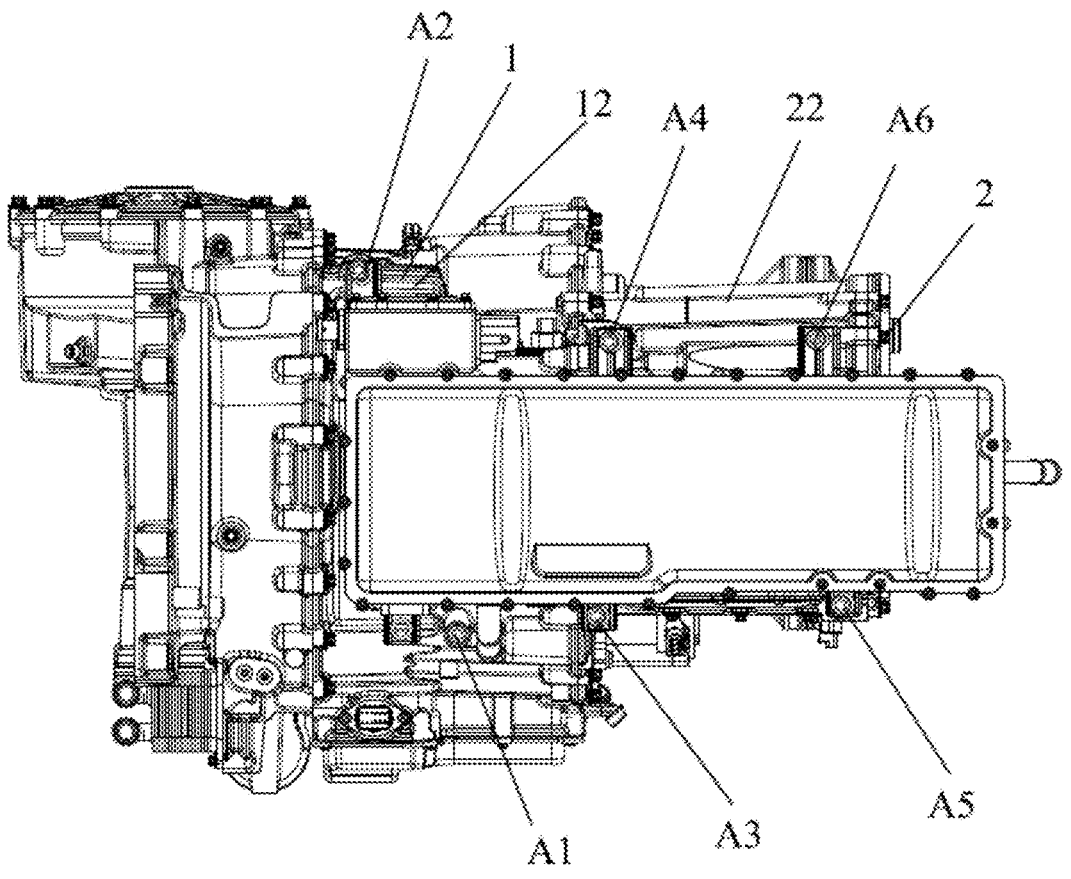
FIG. 4 is a top view of a vehicle driving device according to an embodiment of the present disclosure.

In an embodiment, referring to FIG. 4, the housing 31 of the electric motor controller 3 is fixed to the housing 12 of the first electric motor 1 and the housing 22 of the second electric motor 2 through a front left mounting point A1, a front right mounting point A2, a middle left mounting point A3, a middle right mounting point A4, a rear left mounting point A5, and a rear right mounting point A6. The front left mounting point A1 and the front right mounting point A2 are connected to the housing 12 of the first electric motor 1, and the middle left mounting point A3, the middle right mounting point A4, the rear left mounting point A5, and the rear right mounting point A6 are connected to the housing 22 of the second electric motor 2. In this way, the electric motor controller 3 can be stably mounted at the tops of the first electric motor 1 and the second electric motor 2 through the six points. In an embodiment, connection brackets are arranged/disposed on the housing 31 of the electric motor controller 3 at positions of the front left mounting point A1, the front right mounting point A2, the middle left mounting point A3, the middle right mounting point A4, the rear left mounting point A5, and the rear right mounting point A6. Nuts or threaded connection holes are correspondingly arranged on the housing 12 of the first electric motor 1 and the housing 22 of the second electric motor 2. The connection brackets are fixed to the housing 12 of the first electric motor 1 and the housing 22 of the second electric motor 2 by bolts.

In an embodiment, referring to FIG. 1, the vehicle driving device further includes an engine 5, the variable-speed transmission structure 6, and a differential 7. The variable-speed transmission structure 6 is arranged on a right side of the first electric motor 1. The variable-speed transmission structure 6 includes a first electric motor transmission gear set 61, a second electric motor transmission gear set 62, an engine input gear set 63, an output gear set 64, and a clutch 65. The engine input gear set 63 is connected between a first end of the clutch 65 and the engine 5. The output gear set 64 is connected between a second end of the clutch 65 and the differential 7. The first electric motor transmission gear set 61 is connected between the first electric motor 1 and the engine input gear set 63. The second electric motor transmission gear set 62 is connected between the second electric motor 2 and the output gear set 64. The differential 7 is connected to wheels 8. In an embodiment, referring to FIG. 1, the engine input gear set 63 includes an engine first-stage gear 631 and a clutch input gear 632 that mesh with each other. The engine first-stage gear 631 is connected to the engine 5, and the clutch input gear 632 is connected to the first end of the clutch 65. The first electric motor transmission gear set 61 includes a first electric motor first-stage gear 611 and an engine second-stage gear 612 that mesh with each other. The engine second-stage gear 612 meshes with the engine first-stage gear 631. In an embodiment, a flywheel is connected between the engine 5 and the engine first-stage gear 631.

In an embodiment, referring to FIG. 1, the output gear set 64 includes a clutch output gear 641, a clutch driven gear 642, and a differential input shaft 643. The clutch output gear 641 meshes with the clutch driven gear 642. The clutch driven gear 642 is connected to the differential 7 through the differential input shaft 643. The clutch output gear 641 is connected to the second end of the clutch 65. The second electric motor transmission gear set 62 includes a second electric motor driving gear 621 and a second electric motor driven gear 622 that mesh with each other. The second electric motor driven gear 622 and the clutch output gear 641 are connected to the differential input shaft 643.

In an engine direct driving mode, power of the engine 5 is transferred to the wheels 8 through the engine input gear set 63, the clutch 65, the output gear set 64, and the differential 7. In comparison with the related art, one gear set is eliminated, and transmission efficiency in the engine direct driving mode is improved.

The power of the engine 5 passes through the engine first-stage gear 631, the engine second-stage gear 612, and the first electric motor first-stage gear 611, to drive the first electric motor 1 to generate electricity. The power of the second electric motor 2 passes through the second electric motor driving gear 621, the second electric motor driven gear 622, the differential input shaft 643, and the differential 7, to drive the wheels 8 on left and right sides. In an embodiment, the power of the engine 5 may pass through the engine first-stage gear 631, the clutch input gear 632, the clutch 65, the clutch output gear 641, the clutch driven gear 642, the differential input shaft 643, and the differential 7, to drive the wheels 8 on left and right sides.

The vehicle driving device may have the engine direct driving mode, a pure-electric driving mode, and a hybrid driving mode. In the engine direct driving mode, the clutch 65 is engaged, and the power of the engine 5 passes through the engine first-stage gear 631, the clutch input gear 632, the clutch 65, the clutch output gear 641, the clutch driven gear 642, the differential input shaft 643, and the differential 7, to drive the wheels 8 on left and right sides. In this case, the second electric motor 2 does not work, and the first electric motor 1 generates electricity or idles. In the pure-electric driving mode, the clutch 65 is separated, and the power of the second electric motor 2 passes through the second electric motor driving gear 621, the second electric motor driven gear 622, the differential input shaft 643, and the differential 7, to drive the wheels 8 on left and right sides. In this case, the engine 5 does not work, or the engine 5 works and drives the first electric motor 1 to generate electricity. In the hybrid driving mode, the clutch 65 is engaged, the power of the engine 5 passes through the engine first-stage gear 631, the clutch input gear 632, the clutch 65, the clutch output gear 641, the clutch driven gear 642, the differential input shaft 643, and the differential 7, to drive the wheels 8 on left and right sides, and the power of the second electric motor 2 passes through the second electric motor driving gear 621, the second electric motor driven gear 622, the differential input shaft 643, and the differential 7, to drive the wheels 8 on left and right sides. In this case, the first electric motor 1 generates electricity or idles.

Figure 2:
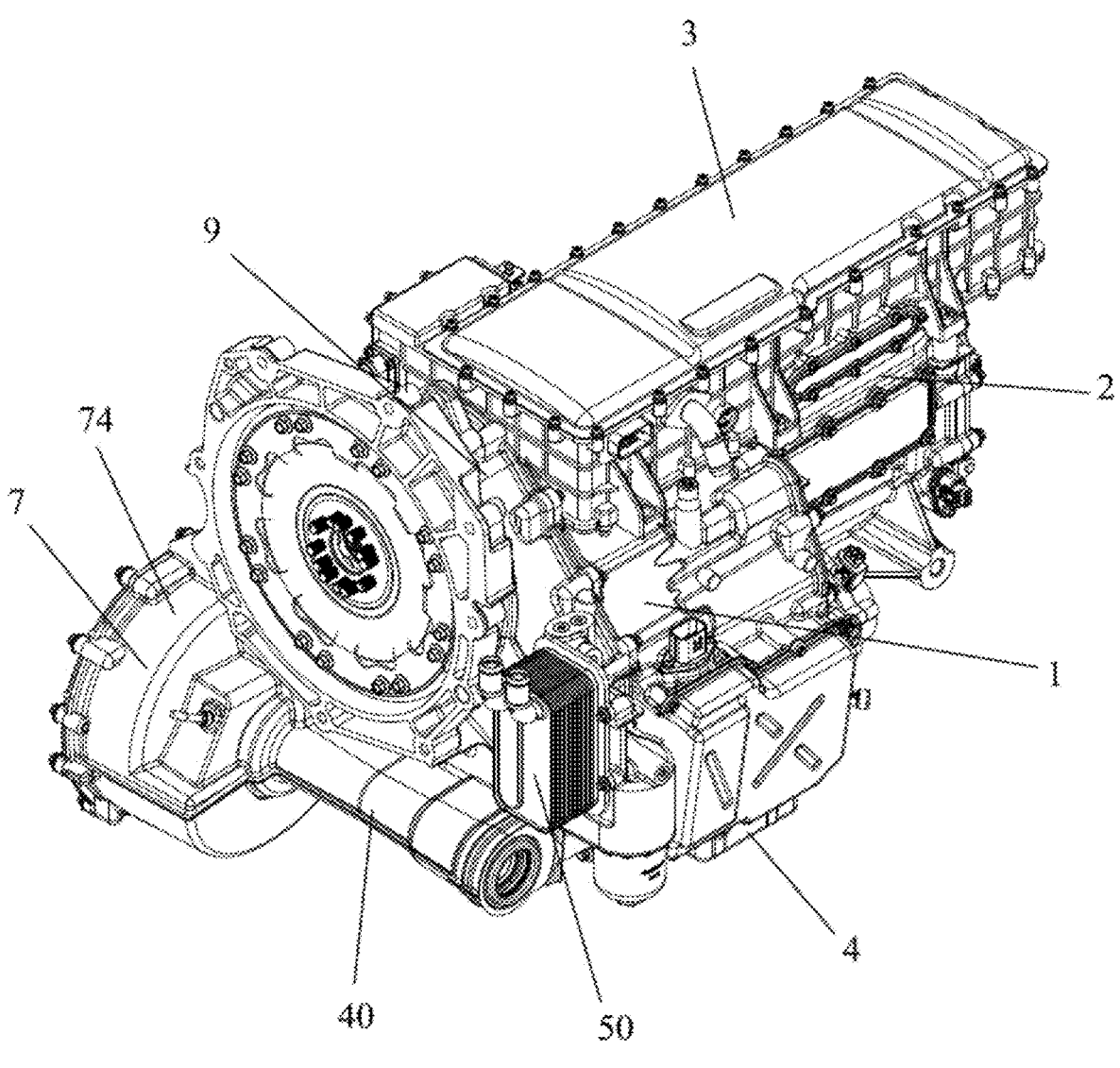
FIG. 2 is a three-dimensional view of a vehicle driving device according to an embodiment of the present disclosure.
Figure 5:
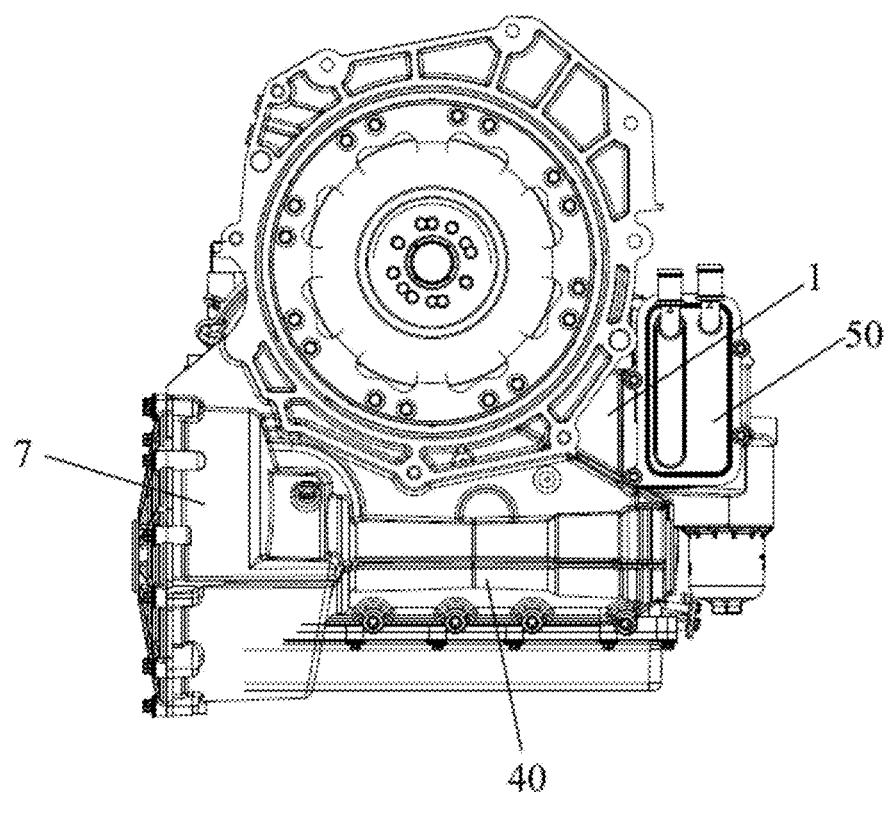
FIG. 5 is a front view of a vehicle driving device according to an embodiment of the present disclosure.

In an embodiment, referring to FIG. 2 and FIG. 5, the differential 7 is arranged on a front lower right side of the first electric motor 1, to make full use of space between the electric motor assembly and the engine 5 at a front end or a steering machine at the front end, thereby reducing impact on a height of a crankshaft center of the engine 5. The differential input shaft 643 is arranged on a lower right side of the first electric motor 1, to make full use of space between a frame and a vehicle body, so that sizes of the vehicle driving device in a middle channel in a Y-direction and a Z-direction are greatly reduced, and a configuration requirement of the engine 5 is satisfied.

In an embodiment, referring to FIG. 2 and FIG. 5, the vehicle driving device further includes a variable-speed transmission structure housing 9. The variable-speed transmission structure housing 9 is fixed to a front end surface of a housing 12 of the first electric motor 1. The first electric motor transmission gear set 61, the engine input gear set 63, the output gear set 64, and the clutch 65 are mounted inside the variable-speed transmission structure housing 9. The second electric motor transmission gear set 62 is mounted inside the housing 12 of the first electric motor 1. In this way, the first electric motor 1, the second electric motor 2, the electric motor controller 3, and the variable-speed transmission structure are integrated together, and an integration level is higher. In addition, because the variable-speed transmission structure 6 is arranged on the right side of the first electric motor 1, the vehicle driving device is more compact in an X-direction (the length direction of the vehicle) and a Z-direction (the height direction of the vehicle), so that middle channel space of the vehicle body is more compact, thereby reducing space occupation of the vehicle in the Z-direction and the X-direction, and improving human-machine interaction performance of a driver and passive safety performance of the entire vehicle.

In an embodiment, referring to FIG. 1 and FIG. 5, the vehicle driving device further includes a left half shaft 10, a middle shaft 20, a right half shaft 30, and a middle shaft tube 40 that is connected to a left side of the differential 7. The differential 7 includes an input bevel gear 71, a left output bevel gear 72, a right output bevel gear 73, and a differential housing 74. The input bevel gear 71, the left output bevel gear 72, and the right output bevel gear 73 are arranged inside the differential housing 74. The middle shaft 20 is connected between the left output bevel gear 72 and the left half shaft 10, the left half shaft 10 is connected to a left wheel 8, and the right half shaft 30 is connected between the right output bevel gear 73 and a right wheel 8. The middle shaft 20 is rotatably arranged in the middle shaft tube 40 through a bearing. The left half shaft 10 and the right half shaft 30 are generally symmetrical. Because the differential 7 is arranged on the lower right side of the first electric motor 1 and close to the right wheel 8, the right half shaft 30 is short. For symmetry, the left half shaft 10 is also short. Therefore, the middle shaft 20 is connected between the left half shaft 10 and the left output bevel gear 72, and the middle shaft 20 is long. Therefore, the middle shaft tube 40 is arranged to provide a fulcrum for the middle shaft 20, thereby improving transmission stability. The middle shaft tube 40 is connected to the left side of the differential 7, to not only ensure that the left half shaft 10 and the right half shaft 30 can be symmetrically arranged, but also improve the convenience of assembly and disassembly.

In some embodiments, the left half shaft 10 and the middle shaft 20 may be combined into one shaft. In this case, the middle shaft tube 40 may not be used.

In an embodiment, referring to FIG. 1, the electric motor shaft 11 of the first electric motor 1 and the electric motor shaft 21 of the second electric motor 2 are arranged spaced away in a width direction of the vehicle. That is, the electric motor shaft 11 of the first electric motor 1 is not coaxial with the electric motor shaft 21 of the second electric motor 2. In this way, space on the right side of the first electric motor 1 may be used to accommodate the variable-speed transmission structure 6.

In an embodiment, the first electric motor 1 and the second electric motor 2 are electrically connected to the electric motor controller 3 respectively through copper bars. In this way, occupied space and costs of a high-voltage wire harness are greatly saved, to facilitate light-weighting of the entire vehicle. The high-voltage wire harness is a wiring system including one or more circuits that operates at a DC voltage of 50V or more, or an AC of 25V or more. The electric motor controller 3 is integrated at the tops of the first electric motor 1 and the second electric motor 2, to prevent multiple high-voltage wire harnesses from being arranged outside the structure, so that a risk that the high-voltage wire harness is squeezed and shorted out during a collision is reduced, thereby improving overall passive safety performance of a high-voltage system.

In an embodiment, a high-voltage direct-current bus interface of the electric motor controller 3 is arranged on a right side of a housing 31 of the electric motor controller 3, and the high-voltage direct-current bus interface is connected to a battery pack through a wire harness. The battery pack is located on a rear side of the electric motor controller 3. In comparison with the arrangement of the high-voltage direct-current bus interface on a rear side of the housing 31 of the electric motor controller 3 in the related art, the high-voltage direct-current bus interface is arranged on the right side of the housing 31 of the electric motor controller 3, so that a size of the electric motor controller 3 in the X-direction is reduced, energy absorption space of the electric motor controller 3 in a head-on collision is enlarged, and a high-voltage safety factor of the entire vehicle is increased.

In an embodiment, referring to FIG. 1 and FIG. 5, the vehicle driving device further includes an oil-cooling plate heat exchanger 50. The oil-cooling plate heat exchanger 50 is arranged on a front left side of the first electric motor 1, to fully use space on the left side of the first electric motor 1. Therefore, not only a configuration requirement is satisfied, but also cooling performance of the vehicle driving device is ensured.

In the vehicle driving device in this embodiment of the present disclosure, the electric motor shaft 11 of the first electric motor 1 and the electric motor shaft 21 of the second electric motor 2 extend in the length direction of the vehicle, the first electric motor 1 is arranged in front of the second electric motor 2, and the electric motor controller 3 is fixed at the tops of the first electric motor 1 and the second electric motor 2. In this way, the electric motor assembly including the first electric motor 1, the second electric motor 2, and the electric motor controller 3 has a high integration level, so that an integration level of the vehicle driving device can be improved, and an overall structure of the vehicle driving device is more compact. In addition, high-voltage wire flinging is avoided, to facilitate the light-weighting of the entire vehicle. In addition, both the first electric motor 1 and the second electric motor 2 are arranged longitudinally, so that a size of the vehicle driving device in the Y-direction is more compact. Because the electric motor controller 3 is arranged at the tops of the two electric motors, and space of the vehicle in the Z-direction is fully used, the size of the vehicle driving device in the Y-direction is smaller. In this way, human-machine interaction space of a driver and a co-driver in the entire vehicle can be improved, and the electric motor assembly is ergonomic while satisfying an ultra-large size required for power economy.

In addition, the vehicle driving device, carrying the corresponding engine 5, can make full use of the space of a front compartment in the X-direction, so that occupation of the space of the vehicle in the Y-direction is reduced, and a larger space is provided for a suspension system, to facilitate operational stability and smoothness of the entire vehicle.

The vehicle driving device is applicable to a front-wheel drive vehicle or a four-wheel drive vehicle (where a wheel-side drive axle may be added to a rear axle of the four-wheel drive vehicle). The vehicle driving device is applicable to new energy vehicle models such as an off-road vehicle, a pickup, and an SUV.

Figure 6:
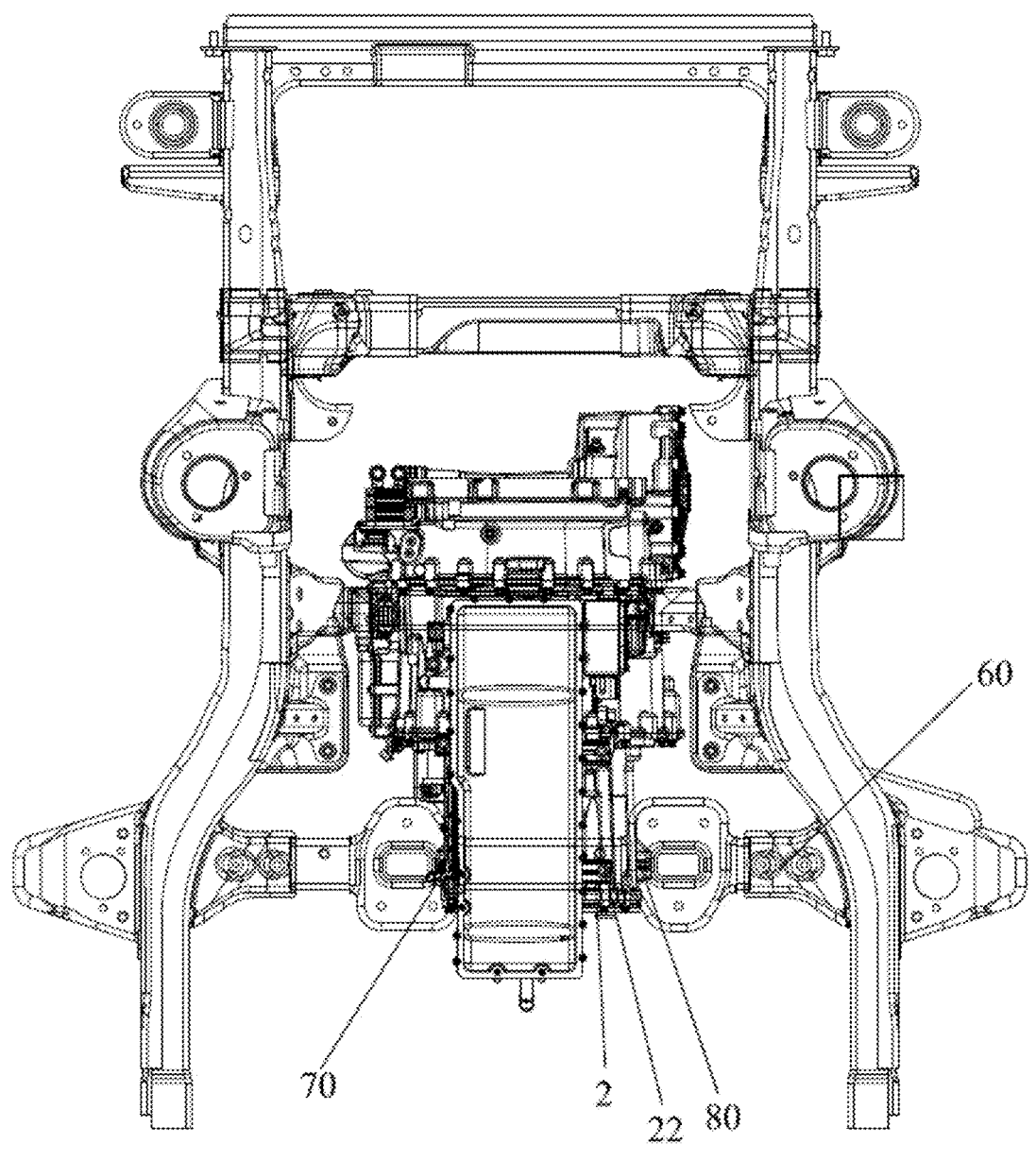
FIG. 6 is a schematic diagram of connection between a vehicle driving device and a frame according to an embodiment of the present disclosure.
Figure 7:
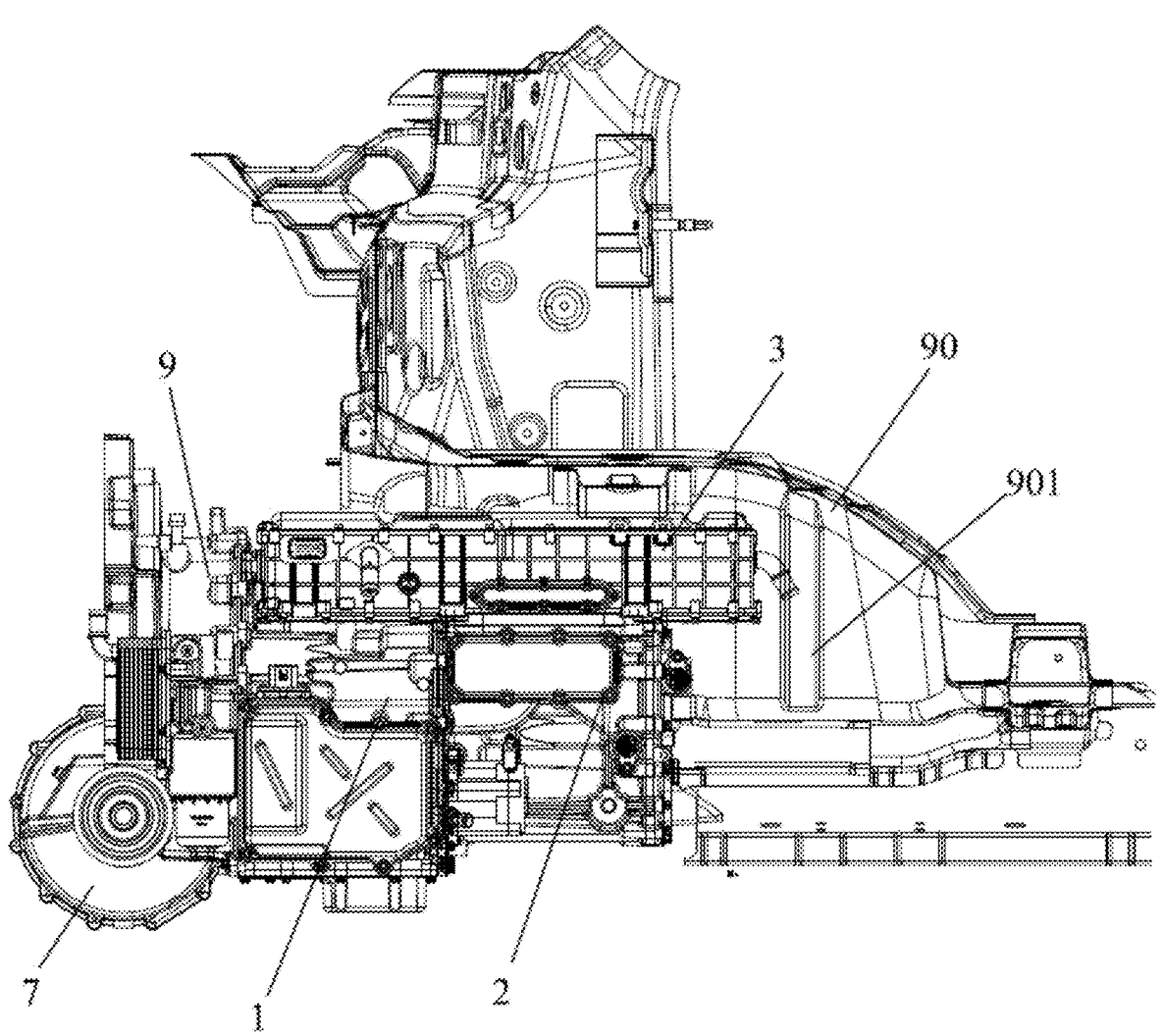
FIG. 7 is a schematic diagram of cooperation between a vehicle driving device and a middle channel according to an embodiment of the present disclosure.

In addition, referring to FIG. 6 and FIG. 7, an embodiment of the present disclosure further provides a vehicle, including a frame 60 and the foregoing vehicle driving device. The vehicle driving device is mounted on the frame 60.

In an embodiment, referring to FIG. 6, a lower left side of a housing 22 of a second electric motor 2 is connected to the frame 60 through a first mount 70, and a lower right side of the housing 22 of the second electric motor 2 is connected to the frame 60 through a second mount 80. In this way, a rear end of the vehicle driving device is connected to the frame 60 through the first mount 70 and the second mount 80. A front end of the vehicle driving device is indirectly mounted on the frame 60 through a front engine mount. Accommodation space for an engine 5 is reserved at the front end of the vehicle driving device, and different types of engines 5 are mounted according to different vehicle models and different power requirements. The vehicle driving device is arranged longitudinally, to make full use of the space of a front compartment in an X-direction, so that use of the space in a Y-direction is reduced, and a larger space is provided for a suspension system, to facilitate operational stability and smoothness of the entire vehicle.

In an embodiment, referring to FIG. 7, the vehicle has a middle channel 90. An accommodating cavity 901 is provided on a front end of the middle channel 90, and a rear side of the vehicle driving device extends into the accommodating cavity 901. In an embodiment, the entire second electric motor 2, a rear part of a first electric motor 1, and a rear part of an electric motor controller 3 are accommodated inside the accommodating cavity 901, and a front part of the electric motor controller 3, a front part of the first electric motor 1, a variable-speed transmission structure housing, and a differential 7 are located outside the accommodating cavity 901.

The longitudinally arranged vehicle driving device is designed in cooperation with a contour of the middle channel 90. Through internal structure optimization, modules are highly integrated, so that not only human-machine interaction space and physical occupied space of another system in the vehicle are ensured, but also functional implementation and process feasibility of the vehicle driving device are ensured. In addition, though a high integration level, high-voltage wire flinging is avoided, to facilitate light-weighting of the entire vehicle.

The foregoing descriptions are merely examples of embodiments of the present disclosure, but are not to limit the present disclosure. Any modification, equivalent replacement, or improvement made within the spirit and principle of the present disclosure shall fall within the protection scope of the present disclosure.

REFERENCE NUMERALS

1: first electric motor; 11: electric motor shaft of the first electric motor; 12: housing of the first electric motor; 2: second electric motor; 21: electric motor shaft of the second electric motor; 22: housing of the second electric motor; 3: electric motor controller; 31: housing of the electric motor controller; 4: oil pan; 5: engine; 6: variable-speed transmission structure; 61: first electric motor transmission gear set; 611: first electric motor first-stage gear; 612: engine second-stage gear; 62: second electric motor transmission gear set; 621: second electric motor driving gear; 622: second electric motor driven gear; 63: engine input gear set; 631: engine first-stage gear; 632: clutch input gear; 64: output gear set; 641: clutch output gear; 642: clutch driven gear; 643: differential input shaft; 65: clutch; 7: differential; 71: input bevel gear; 72: left output bevel gear; 73: right output bevel gear; 74: differential housing; 8: wheels; 9: variable-speed transmission structure housing; 10: left half shaft; 20: middle shaft; 30: right half shaft; 40: middle shaft tube; 50: oil-cooling plate heat exchanger; 60: frame; 70: first mount; 80: second mount; 90: middle channel; and 901: accommodating cavity.

What is claimed is:

1. A vehicle driving device, comprising an electric motor assembly, wherein the electric motor assembly comprises:
a first electric motor;
a second electric motor, an electric motor shaft of the first electric motor and an electric motor shaft of the second electric motor extending in a length direction of a vehicle, and the first electric motor disposed in front of the second electric motor; and
an electric motor controller disposed at a top of the first electric motor and a top of the second electric motor, the first electric motor and the second electric motor electrically connected to the electric motor controller, wherein
a housing of the second electric motor is connected to a rear surface of a housing of the first electric motor, the electric motor controller is strip-shaped and extends in the length direction of the vehicle, and a housing of the electric motor controller is disposed at a top of the housing of the first electric motor and a top of the housing of the second electric motor.

2. The vehicle driving device according to claim 1, further comprising an oil pan connected to a bottom of the first electric motor.

3. The vehicle driving device according to claim 1, further comprising an engine, a variable-speed transmission structure, and a differential, wherein:
the variable-speed transmission structure is disposed on a right side of the first electric motor; and
the variable-speed transmission structure comprises a first electric motor transmission gear set, a second electric motor transmission gear set, an engine input gear set, an output gear set, and a clutch, the engine input gear set is connected between a first end of the clutch and the engine, the output gear set is connected between a second end of the clutch and the differential, the first electric motor transmission gear set is connected between the first electric motor and the engine input gear set, the second electric motor transmission gear set is connected between the second electric motor and the output gear set, and the differential is connected to wheels of the vehicle.

4. The vehicle driving device according to claim 3, wherein:
the engine input gear set comprises an engine first-stage gear and a clutch input gear that mesh with each other, the engine first-stage gear is connected to the engine, and the clutch input gear is connected to the first end of the clutch; and
the first electric motor transmission gear set comprises a first electric motor first-stage gear and an engine second-stage gear that mesh with each other, and the engine second-stage gear meshes with the engine first-stage gear.

5. The vehicle driving device according to claim 3, wherein:
the output gear set comprises a clutch output gear, a clutch driven gear, and a differential input shaft, the clutch output gear meshes with the clutch driven gear, the clutch driven gear is connected to the differential through the differential input shaft, and the clutch output gear is connected to the second end of the clutch; and
the second electric motor transmission gear set comprises a second electric motor driving gear and a second electric motor driven gear that mesh with each other, and the second electric motor driven gear and the clutch output gear are connected to the differential input shaft.

6. The vehicle driving device according to claim 5, wherein the differential is disposed on a front lower right side of the first electric motor, and the differential input shaft is disposed on a lower right side of the first electric motor.

7. The vehicle driving device according to claim 3, further comprising a variable-speed transmission structure housing, wherein
the variable-speed transmission structure housing is disposed to a front surface of a housing of the first electric motor,
the first electric motor transmission gear set, the engine input gear set, the output gear set, and the clutch are mounted inside the variable-speed transmission structure housing, and
the second electric motor transmission gear set is mounted inside the housing of the first electric motor.

8. The vehicle driving device according to claim 3, further comprising a left half shaft, a middle shaft, a right half shaft, and a middle shaft tube that is connected to a left side of the differential, wherein:
the differential comprises an input bevel gear, a left output bevel gear, and a right output bevel gear, the middle shaft is connected between the left output bevel gear and the left half shaft, the left half shaft is connected to a left wheel, and the right half shaft is connected between the right output bevel gear and a right wheel; and
the middle shaft is disposed in the middle shaft tube.

9. The vehicle driving device according to claim 1, wherein the electric motor shaft of the first electric motor and the electric motor shaft of the second electric motor are spaced away from each other in a width direction of the vehicle.

10. The vehicle driving device according to claim 1, wherein the first electric motor and the second electric motor are electrically connected to the electric motor controller respectively through copper bars.

11. The vehicle driving device according to claim 1, wherein a high-voltage direct-current bus interface of the electric motor controller is disposed on a right side of a housing of the electric motor controller, and is connected to a battery pack through a wire harness.

12. The vehicle driving device according to claim 1, further comprising an oil-cooling plate heat exchanger disposed on a front left side of the first electric motor.

13. A vehicle, comprising a frame and a vehicle driving device mounted on the frame, wherein the vehicle driving device comprises an electric motor assembly, and the electric motor assembly comprises:

a first electric motor;

a second electric motor, an electric motor shaft of the first electric motor and an electric motor shaft of the second electric motor extending in a length direction of the vehicle, and the first electric motor disposed in front of the second electric motor; and an electric motor controller disposed at a top of the first electric motor and a top of the second electric motor, the first electric motor and the second electric motor electrically connected to the electric motor controller, wherein a housing of the second electric motor is connected to a rear surface of a housing of the first electric motor, the electric motor controller is strip-shaped and extends in the length direction of the vehicle, and a housing of the electric motor controller is disposed at a top of the housing of the first electric motor and a top of the housing of the second electric motor.

14. The vehicle according to claim 13, wherein a lower left side of a housing of the second electric motor is connected to the frame through a first mount, and a lower right side of the housing of the second electric motor is connected to the frame through a second mount.

15. The vehicle according to claim 13, wherein the vehicle driving device further comprises an oil pan connected to a bottom of the first electric motor.

16. The vehicle according to claim 13, wherein the vehicle driving device further comprises an engine, a variable-speed transmission structure, and a differential, and wherein:

the variable-speed transmission structure is disposed on a right side of the first electric motor; and the variable-speed transmission structure comprises a first electric motor transmission gear set, a second electric motor transmission gear set, an engine input gear set, an output gear set, and a clutch, the engine input gear set is connected between a first end of the clutch and the engine, the output gear set is connected between a second end of the clutch and the differential, the first electric motor transmission gear set is connected between the first electric motor and the engine input gear set, the second electric motor transmission gear set is connected between the second electric motor and the output gear set, and the differential is connected to wheels of the vehicle.

17. The vehicle according to claim 16, wherein:

the engine input gear set comprises an engine first-stage gear and a clutch input gear that mesh with each other, the engine first-stage gear is connected to the engine, and the clutch input gear is connected to the first end of the clutch; and the first electric motor transmission gear set comprises a first electric motor first-stage gear and an engine second-stage gear that mesh with each other, and the engine second-stage gear meshes with the engine first-stage gear.

* * * * *